(12) United States Patent
Lehmann et al.

(10) Patent No.: US 7,154,522 B2
(45) Date of Patent: Dec. 26, 2006

(54) QUALITY PRINTING METHOD, PRINTING MACHINE, AND CORRESPONDING PRINTING SUBSTANCE

(75) Inventors: Udo Lehmann, Bickenbach (DE); Dirk Meyer, Kaiserslautern (DE)

(73) Assignee: Aurentum Innovationstechnologien GmbH, Mainz (DE)

( * ) Notice: Subject to any disclaimer, the term of this patent is extended or adjusted under 35 U.S.C. 154(b) by 0 days.

(21) Appl. No.: 10/506,591

(22) PCT Filed: Feb. 19, 2003

(86) PCT No.: PCT/DE03/00500

§ 371 (c)(1), (2), (4) Date: May 25, 2005

(87) PCT Pub. No.: WO03/074278

PCT Pub. Date: Sep. 12, 2003

(65) Prior Publication Data
US 2005/0212888 A1    Sep. 29, 2005

(30) Foreign Application Priority Data
Mar. 7, 2002    (DE) ............... 102 10 146

(51) Int. Cl.
B41J 2/435  (2006.01)
(52) U.S. Cl. .................... 347/224
(58) Field of Classification Search ........... 347/171, 347/224, 213
See application file for complete search history.

(56) References Cited
U.S. PATENT DOCUMENTS

| | | | |
|---|---|---|---|
| 4,702,958 A | 10/1987 | Itoh et al. | 428/323 |
| 5,326,619 A | 7/1994 | Dower et al. | 428/164 |
| 5,854,175 A | 12/1998 | DeBoer et al. | 503/227 |
| 2003/0156178 A1* | 8/2003 | Lehmann | 347/103 |

FOREIGN PATENT DOCUMENTS

| | | |
|---|---|---|
| DE | 691 32 508 T2 | 9/1991 |
| DE | 693 01 715 T2 | 10/1993 |
| DE | 694 07 888 T2 | 6/1994 |
| DE | 694 15 028 T2 | 9/1994 |
| DE | 697 00 632 T2 | 1/1997 |
| DE | 197 46 174 C1 | 10/1997 |
| DE | 100 51 850 A1 | 10/2000 |
| DE | 101 17 711 A1 | 4/2001 |
| DE | 101 38 772 A1 | 8/2001 |
| DE | 101 39 822 A1 | 8/2001 |
| EP | 0 552 251 B1 | 9/1991 |
| EP | 0 530 018 A1 | 8/1992 |
| EP | 0 658 443 A1 | 12/1994 |
| EP | 0 790 138 B1 | 1/1997 |
| GB | 2 007 162 A | 10/1978 |
| GB | 2 083 726 A | 9/1981 |
| JP | 2001315447 | 11/2001 |
| WO | WO 98/47718 | 4/1998 |

* cited by examiner

Primary Examiner—Huan Tran
(74) Attorney, Agent, or Firm—Michael L. Dunn (57) ABSTRACT

A printing process for the transfer of printing substance (2) from an ink carrier (1) to an imprinting material (6), in which, with the help of an energy-emitting apparatus, which, during a process period, emits energy in the form of electromagnetic waves (3), and the printing substance (2) undergoes a change in volume and/or position, wherein, with the help of absorption bodies (4), energy is transferred from the electromagnetic waves (3) into the printing substance (2). The invention also includes an apparatus for practicing the process of the invention and a printing substance containing absorption bodies.

49 Claims, 10 Drawing Sheets

QUALITY PRINTING METHOD, PRINTING MACHINE, AND CORRESPONDING PRINTING SUBSTANCE

BACKGROUND OF THE INVENTION

The present invention relates to a printing process for the transfer of printing substance from an ink carrier onto an imprinting material, in which, with the help of an energy-emitting apparatus which emits energy during a process period in the form of electromagnetic waves, the printing substance undergoes a change in volume and/or position, and for example as a result a transfer of a printing point onto the imprinting material takes place, as well as a printing machine and a printing substance for this.

By a printing process is meant primarily a process for the reproduction as often as required of text and/or image patterns by means of a printing plate which is re-inked after each impression. In general, a distinction is made here between four basically different printing processes. Thus firstly the relief printing process is known, in which the printing elements of the printing plate are raised, while the non-printing parts are recessed. This includes for example letterpress printing and so-called flexographic or aniline printing. Furthermore, flatbed-printing processes are known in which the printing elements and the non-printing parts of the printing plate essentially lie in one level. These include offset printing in which strictly speaking the inked drawing on the printing plate is not printed directly onto the imprinting material, but is first transferred onto a rubber cylinder or a rubber blanket and only then is the imprinting material printed from this. Where in the following reference is made to imprinting material, however, this is to be understood as both the actual imprinting material, i.e. the material to be printed on, and any chosen transfer means, such as e.g. a rubber cylinder. A third process is the so-called gravure printing process in which the printing elements of the printing plate are recessed. A gravure printing process used industrially is so-called rotogravure printing. Finally, a porous printing process is also known in which at the printing positions the ink is transferred onto the imprinting material through screen-like openings of the printing plate.

These printing processes are all characterized by the fact that they require a printing plate which was more or less costly to produce, with the result that these printing processes operate profitably only with very long print runs, usually well over 1000 units.

For the printing of short print runs, printers are already used which are often connected to an electronic data processing system. These use generally digitally triggerable printing systems which are in a position to print individual printing points as required. Such printing systems use various processes with different printing substances on different imprinting materials. Some examples of digitally triggerable printing systems are: laser printers, thermal printers and ink jet printers. Digital printing processes are characterized by the fact that they do not require printing plates.

Thus for example an electro-thermal ink jet printing process is known for example from GB 2 007 162, in which the water-based ink is briefly heated in a suitable ink jet by electrical pulses until it boils, with the result that a gas bubble suddenly forms and an ink drop is ejected from the jet. This process is generally known by the term "bubble-jet". However, these thermal ink printing processes have in turn the disadvantage that on the one hand they consume a great deal of energy for the printing of an individual printing point and on the other hand they are suitable only for printing processes which are water-based. Furthermore, every single printing point must be triggered separately by the jet. On the other hand, piezoelectric ink printing processes suffer from the disadvantage that the required jets are easily blocked, with the result that only special and expensive inks can be used for this.

It is known from DE 197 46 174 that a laser beam, through very short pulses in a printing substance which is located in cells of a printing roller, induces a procedure with the result that the printing substance undergoes a change in volume and/or position. As a result, the printing substance spreads over the surface of the printing plate and it is possible to transfer a printing point onto an imprinting material moved up against same. However, in this process it is disadvantageous that the filling of the cells is very difficult due to the small diameter of the cells. Therefore it is proposed in DE 100 51 850 to apply the printing substance essentially forming a continuous film to the ink carrier. The energy can be either transferred directly into the printing substance or firstly into an absorption layer which is applied to the ink carrier, and which in turn emits the energy to the printing substance. In the first case, special printing substances must be used which are capable of absorbing the energy. This severely restricts the variety of printing inks that can be used. In addition, the absorption of the light in the printing ink takes place within a relatively large volume passed through by the laser beam. With some inks the energy is also not completely absorbed. The absorption is also strongly dependent on the printing substance used and the actual thickness of the printing substance on the ink carrier. Due to the relatively large volume in which the energy is absorbed, a relatively large amount of energy must be introduced into the printing substance in order to induce the change in volume and/or position of the printing substance necessary to set a printing point. Moreover, a delay in boiling often occurs with the result that the temperature at which gas bubbles form in the printing substance cannot be predicted. This means that the absorption—and the local heating of the printing substance associated therewith—takes place largely uncontrolled, which results i.a. in a marked variation in printing-point size. To ensure that the desired printing point is set in each case, much more energy must therefore be introduced into the printing substance than is usually necessary to induce the desired change in position and/or volume of the printing substance.

If on the other hand the printing substance is heated indirectly by introducing the energy firstly into an absorption layer, the required energy is generally even higher as, in addition to the printing substance, the absorption layer must also now be heated. In addition, the heat conduction in the absorption layer must not be ignored, with the result that a larger area of the absorption layer is necessarily heated, which likewise increases the required energy. Moreover, with the known processes, even a detachment of the absorption layer often occurs.

BRIEF DESCRIPTION OF THE INVENTION

The object of the present invention is therefore to provide a printing process which has an improved printing quality and which requires much less energy for printing a printing point, but which at the same time allows a high printing speed with high resolution capacity. The object of the present invention is also to provide a corresponding printing machine and a corresponding printing substance with which the printing process according to the invention can be realized.

More particularly, the invention includes a printing process for the transfer of printing substance (2) from an ink carrier (1) to an imprinting material (6), in which, with the help of an energy-emitting apparatus, which, during a process period, emits energy in the form of electromagnetic waves (3), and the printing substance (2) undergoes a change in volume and/or position, wherein, with the help of absorption bodies (4), energy is transferred from the electromagnetic waves (3) into the printing substance (2). The invention also includes an apparatus for practicing the process of the invention and a printing substance containing absorption bodies.

DETAILED DESCRIPTION OF THE INVENTION

As regards the process, the object is achieved in that the energy is transferred from the electromagnetic radiation into the printing substance with the help of absorption bodies.

Without absorption bodies, the electromagnetic wave penetrates far into the printing substance and is absorbed along a relatively large area. To now achieve the necessary change in volume and/or position of the printing substance, a relatively large area of the printing substance must be heated until a gas bubble forms. The effect of using absorption bodies is that the electromagnetic wave is absorbed essentially at the surface of the absorption body, i.e. over a much smaller area. As a result, even with a very much smaller energy contribution, a heating occurs at certain points with the result that the desired change in volume and/or position of the printing substance already takes place earlier. Moreover, a delay in boiling can be effectively prevented through the presence alone of the boundary surfaces between printing substance and absorption bodies which act as a type of crystal nucleus.

Through the use of absorption bodies, the required energy can thus be drastically reduced. There is also a controlled change in position and/or volume of the printing substance, which moreover scarcely still depends on the printing substance used.

Another preferred version of the process according to the invention provides that through the induced change in position, some of the printing substance is detached from the ink carrier and the ink carrier than comes directly into contact with the imprinting material with the result that, at those points at which a change in position has been induced, no transfer of printing substance onto the imprinting material takes place. In other words, with this version, the electromagnetic wave is directed to those areas which are not to transfer printing substance.

In a particularly preferred version of the present invention, absorption bodies are used which are smaller than the wavelength of the electromagnetic waves, preferably smaller than a tenth, particularly preferably smaller than a fiftieth of the wavelength of the electromagnetic waves.

Through the use of such small absorption bodies, the absorption effect is further increased as the waves are no longer scattered at such smaller bodies, but exclusively absorbed.

Advantageously, the energy-emitting apparatus emits energy in the form of laser light. With the help of highly coherent monochromatic laser light, a relatively high amount of energy can be emitted onto a very small area with very short light pulses. As a result, the quality of the print format and in particular the resolution is increased. A short light pulse need not necessarily come from a pulsed laser. It is, rather, actually advantageous if a laser is used in CW operation instead. The pulse duration or better the exposure time does not then depend on the length of the laser pulse but on the scanning speed of the focus. Moreover, the data to be transferred need no longer be synchronized to the fixed pulse frequency.

In a further particularly preferred version it is provided that a printing substance is used which contains the absorption bodies. As a result, the area in which the electromagnetic waves are absorbed can be reduced still further, which leads to a further reduction of the required energy supply.

A further particularly preferred version provides that the absorption bodies absorb essentially all the light wavelengths. This ensures that the absorption is as complete as possible.

However, the consequence of this, in particular when the absorption bodies are contained in the printing substance, can be that not all colours, in particular no bright colours, can be used as the colour of the printing substance is changed by the addition of the absorption bodies which absorb essentially all the light wavelengths.

Therefore it is provided in another particularly preferred version that the absorption bodies essentially absorb only radiation with a wavelength or in a wavelength range which corresponds to the wavelength or the wavelength range of the electromagnetic waves emitted by the energy-emitting apparatus. The absorption bodies thus merely filter the light of the energy-emitting apparatus out of the incident light, while all the other light wavelengths can pass unhindered, with the result that the influence of the absorption bodies on the colour of the printing substance is negligible. Through this measure, the variety of the printing substances to be used can be clearly increased, as the absorption bodies need merely be added to the printing substances.

Naturally it is also possible, through a suitable choice of the wavelength range in which incident light is absorbed, to also use the absorption bodies as a dye or pigment.

In a particularly preferred version of the present invention, the energy-emitting apparatus or the beam path of the electromagnetic waves are arranged such that the absorption bodies are accelerated through the electromagnetic waves of the energy-emitting apparatus in the direction of the imprinting material. As a result the change in volume and/or position of the printing substance is supported in advantageous manner. The acceleration of the absorption bodies alone results in a type of shock wave in the printing substance with the result that, in combination with the forming gas bubble, a defined drop detachment is favoured. This can be realized for example in that the ink carrier is designed transparent and the light beam from the side of the ink carrier facing away from the printing substance is focussed through the former into the printing substance. On the side of the absorption body facing the ink carrier, a gas bubble then forms explosively which ensures the acceleration of the absorption body in the direction of the imprinting material.

Naturally it is not absolutely necessary for the absorption bodies to be arranged in the printing substance. In particular when using transparent printing substances an ink carrier is used according to the invention on the surface of which, provided to receive the printing substance absorption bodies are present which preferably form a solid layer.

The only essential is that the printing substance comes into contact with the absorption body as directly as possible. However the printing substance need not surround the absorption bodies completely. Because the energy is now no longer absorbed in an absorption layer, but on an absorption body, the surrounding area is heated only very slightly. It is thus possible through the process according to the invention to heat the—preferably very small—absorption body in a targeted manner without losses occurring due to heat conduction.

Because a targeted and reproducible change in position and/or volume of the printing substance can be induced with the help of the absorption bodies, the printing-point size can now advantageously be controlled through the amount of energy emitted by the energy-emitting apparatus. This control can be effected for example by varying the process period or the pulse duration. Although such a control has already been proposed in principle in DE 100 51 850, it was not practicable without the use of absorption bodies as the uncontrolled scatter of the printing-point size overlays the control of the printing-point size via the pulse duration.

When using laser light in another particularly preferred version the printing-point size can also be controlled by the profile of the laser light. By profile of the laser light is meant various transverse electromagnetic modes TEM.

Differences in brightness of the image to be printed can advantageously be achieved by variation of the printing-point size.

Surprisingly, tests have shown that the best printing results are achieved when the process period or the pulse duration is shorter than 1 μs, preferably shorter than 250 nanoseconds, particularly preferably shorter than 100 nanoseconds and best of all shorter than 50 nanoseconds.

Moreover it is particularly preferred if during the process period or during the pulse duration an energy density higher than 500 kW/cm$^2$, preferably higher than 2 MW/cm$^2$ and particularly preferably higher than 10 MW/cm$^2$ is achieved at the surface of the irradiated absorption body.

Furthermore, tests have shown that the best printing quality can be achieved when the radiation-exposed surface of the absorption body is heated during the process period or pulse duration at an average heating rate greater than $10^9$ K/s, preferably greater than $10^{10}$ K/s, particularly preferably greater than $10^{11}$ K/s.

Through the last-named measures a very rapid, point-precise heating of the absorption body results, with the result that—in contrast to the processes of the state of the art—a shock wave and not a sound wave is produced, which leads to a clear improvement of the printing quality.

The above measures for improving the printing quality are also based, among other things, on a novel raster method, which is preferably used in the present invention, but which in principle can also be used independently of the other features of the present invention. This consists of a line spacing in which printing occurs line-by-line and the individual lines have a very tight distance between each other and even touch in an ideal case, with the result that in vertical direction the resolution is set by the distance between lines or the line width. However no fixed point raster is provided in horizontal direction. Instead the "pixels" consist in horizontal direction of line segments of the respective raster lines of varying length with any chosen starting and end point. The scanning of the individual lines preferably takes place with a continuous wave laser which according to requirements is simply masked or switched off or its energy is reduced, so as to not print individual sections of the raster lines, while those line segments where the laser is not masked or turned off are printed. However, the laser itself continues to operate in continuous wave mode in principle. The length of a printed line segment depends simply on the length of the switching-on or revealing time of the laser on the respective line. A printed line thus consists of a sequence of line segments which in general are of different length, their length being determined simply by the switching-on time of the laser, the individual line segments having a line width which essentially remains constant, which ideally corresponds exactly to the distance between adjacent scanning lines or can even be slightly larger (or smaller).

However these lines have at their ends small "run-outs" or "roundings", which correspond to the rise time or fall time of the laser during switching on or off or during masking or revealing. Only if the switch-on period or the exposure period for a specific line segment becomes shorter than the rise time and/or fall time at the ends of the respective line segments is the width of the printed line also reduced with the correspondingly reduced length of the printed "line", with the result that when switch-on time is extremely short only points are printed and when switch-on times vary on in the range of the rise and fall times, points of different sizes or different diameters below the line width can be printed. In principle any chosen and very fine shades of grey can be produced in this way.

The position of the individual line segments, i.e. in particular their start and end, is not specified by any one grid, but can be varied as desired. In this respect the corresponding printing process is strictly speaking screened only in vertical direction, i.e. perpendicular to the pattern of the individual printed lines, while a "continuous" printing takes place within the lines, i.e. in principle a continuous line is printed which can however be interrupted at any chosen points and for any lengths, with the result that the printed line sections are corresponding line segments of constant width and any choosable length. Only when the length of these line segments is comparable with their width or even shorter is the width of these lines also reduced, with the result that the corresponding line segments are then shortened to individual points, which can also be reduced even further in their diameter measured in width direction of the lines by further reducing the switch-on time of the laser.

The laser used is preferably a phase-coupled or a CW laser with an average output of more than 10 watts and a beam parameter $M^2<1.5$. The "switching-on" and "switching-off" of the laser expediently takes place via a pulse-width modulator in combination with a suitable laser switch (e.g. AOM, EOM). However, in the preferred variant of the invention the laser beam is not fully "turned off" but is only reduced in its energy or energy density to below a threshold limit beneath which there is no detachment of dye drops from the ink carrier. For example there is a reduction in the laser output to 15% of the value used for a full printing point. This simplifies the control and monitoring of the laser energy when printing, in particular an improved and more effective use of the laser switches or modulators is thereby made possible. In the case where an AOM "switch" is used the laser can thus be used at order 0, while conventional applications of AOM switches have to use the $1^{st}$ diffraction order. Advantageously the laser has a wavelength between 0.5 μm and 3 μm.

In addition the selected thickness of the printing substance on the ink carrier should be less than 50 μm, preferably less than 30 μm, particularly preferably less than 20 μm. The thickness of the printing substance layer should not fall below 5 μm, however. The optimal range is between 10 and 15 μm.

Advantageously the printing substance is selected such that the viscosity lies between 0.05 and 0.5 Pas.

The energy required can be even further reduced if absorption bodies and printing substance are selected such that the absorption bodies are wetted as well as possible by the printing substance. It is thereby ensured that the energy applied to the absorption body is dissipated in the printing substance as directly as possible.

As regards the printing machine, the object mentioned at the start is achieved by means of a printing machine for printing on an imprinting material which has an ink carrier and an energy-emitting apparatus which is arranged such that the energy can be transferred in a targeted manner to certain areas of the ink carrier, absorption bodies being provided for absorbing the energy. The energy-emitting apparatus is preferably a laser.

Preferably the absorption bodies have a size smaller than 1 μm, preferably smaller than 200 nanometers and particularly preferably a size between 10 and 50 nanometers. With such small absorption bodies it is ensured that almost no light scattering occurs. The absorption bodies preferably consist of carbon black particles.

The absorption bodies are preferably arranged in an absorption layer applied to the ink carrier.

In a particularly preferred version the proportion of absorption bodies in the absorption layer is more than 40 wt.-%, preferably more than 70 wt.-% and particularly preferably more than 90 wt.-%.

In another particularly preferred version the absorption layer consists of pressed absorption bodies.

The absorption bodies can also be embedded in an organic or inorganic polymer matrix, such as e.g. polysilicates but also epoxy resin. It is also possible to embed the absorption bodies in an elastomer matrix, for example rubber. It is thereby ensured that the absorption bodies are arranged largely separated from one another.

An expedient version provides that the ink carrier consists of a transparent polymer strip (polyester), because there is then a good wettability for printing substances based on an alcoholic, aqueous or aromatic solvent.

As regards the printing substance, the object mentioned at the start is achieved by a printing substance which contains absorption bodies.

These absorption bodies advantageously are of a size smaller than 1 μm, preferably smaller than 200 nm and particularly preferably between 10 and 50 nm.

In particularly preferred versions of the printing substance the printing substance consists of binder, dye or pigment, solvent, additives and the absorption bodies.

In another particularly preferred version the absorption body forms the dye, i.e. the absorption body has a natural frequency band in the visible region, with the result that selectively determined frequency areas are absorbed.

A further advantageous version provides that the printing substance has a blowing agent. A blowing agent is an agent which boils at a relatively low temperature, so that gas bubbles already form at a low temperature. A further reduction of the energy to be supplied can thereby be achieved. Printing substances which boil at a temperature $\leq 100°$ C. are particularly suitable. Advantageously the blowing agent is used as solvent at the same time. Alcohols, esters, ketones and water among others may be used as blowing agent. In the case of solvent-free inks, e.g. offset inks or UV inks, blowing agents are expediently added.

Expediently more than 10 wt.-%, preferably more than 12 wt.-% and particularly preferably more than 15 wt.-% blowing agent is added. The blowing agent content should be less than 30 wt.-% overall, however.

According to the invention the described printing substance is used in the described printing process according to the invention and/or in the described printing machine according to the invention.

In the preferred version of the invention the printing machine contains a printing carrier which has a surface structure consisting of recesses and elevations, which is designed such that it acts at least partly focussing on a shock wave produced on or immediately above the surface of the ink carrier. These microstructures, e.g. recesses or elevations, are firstly to be smaller than a typical laser beam diameter which is used to produce the shock wave by local heating of the printing substance and they should above all be arranged periodically in at least one dimension, with the period also having a shorter repetition interval than corresponds to the typical diameter of the laser beam. It is also sufficient if there is also microstructurization in essentially only one direction, i.e. if the microstructures consist of e.g. grooves or ribs, which typically run perpendicular to the scanning direction of the laser beam. Preferably the recesses or elevations have a diameter or distance of the order of magnitude of 30μ and smaller, preferably smaller than 15 μ. The focussing effect is achieved for the pressure waves in a similar way as for the electromagnetic, in particular optical waves. Specifically, therefore, slightly concave shapes, e.g. grooves with an elliptical or concave, optionally also circular cross-section, are provided, where the focussing direction should run as perpendicular as possible to the enveloping surface of the ink carrier, in order that the dye drops ejected essentially perpendicular to the enveloping surface of the ink carrier by a correspondingly directed shock wave have as short a path as possible to the imprinting material and thus have as small as possible a divergence.

The exact design of the recesses depends among other things on the irradiation direction of the laser beam and on whether the laser beam is directed onto an absorption layer or whether absorption bodies are contained in the printing ink itself.

It is to be borne in mind, as already mentioned, that in contrast to the state of the art, which partly also already shows surface structures, the surface structures according to the invention have considerably smaller characteristic dimensions, with the result that a specific printing point thus generally comprises several adjacent structural elements.

The focusing effect of specific structures can also theoretically be determined according to the rules of optics or optical reflection and/or refraction. The result of a laser beam striking in the area of corresponding structural elements is a very sudden local heating and/or evaporation of the blowing agent, with the result that an explosive pressure wave develops at the site of the heating. This pressure wave is either produced at the base of the ink carrier itself or is reflected there, with the result that on this basis the preferable alignment and focussing of the pressure wave in a preset surface structure can already be easily estimated. Although smaller scatter proportions can never be completely avoided, these are generally not important, especially when, because of the low energy of this scatter proportion, this energy is not sufficient to detach small ink drops or if the surface tension of the ink drop is sufficient to essentially hold the latter together and to detach it only in the main direction of the shock wave.

The microstructurization and the restriction of the microstructures to characteristic dimensions, which are even smaller than the diameter of the laser beam scanned away via the ink carrier are thus also important because, in contrast to the state of the art, the afterflow of ink into the microstructures is to be as unrestricted and rapid as possible. Because of the small size of the microstructures the ink layer is also always thicker than the depth of the microstructures, with the result that for these reasons alone the individual recesses cohere over the ink layer.

It is understood that elevations attached in a targeted manner periodically and on a small scale can also be designed such that they have a corresponding focussing effect.

Additional advantageous designs are given in the dependent claims.

Other advantages, features and possible applications of the present invention will become apparent from the following description of preferred versions and from the associated figures.

Figure 1A:
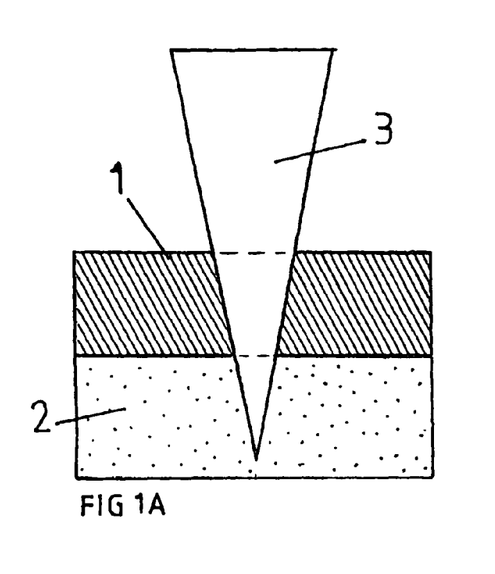
FIGS. 1A through 1C show schematic representations of the operating principle of a first version of the process.

FIG. 1A shows diagrammatically the situation in the case of a printing process of the state of the art. A laser beam 3 is focussed into the printing substance 2 through the ink carrier 1. The laser beam thus passes through the ink carrier into the printing substance and is absorbed over a large area. The result is that the energy requirement for printing a point is very high, which slows down the printing process and thus reduces the printing speed.

Figure 1B:
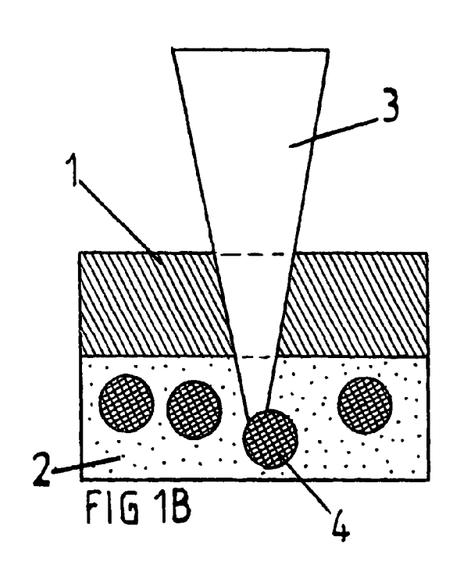

FIG. 1B shows diagrammatically a first version of the printing process according to the invention. Here, absorption bodies 4 are introduced into the printing substance 2. Here, the laser beam 3 now ensures that the surface of the absorption body 4 heats up strongly, with the result that the energy introduced by the laser beam 3 essentially leads to a punctiform heating of the absorption body 4. Absorption body 4 and printing substance 2 are advantageously selected such that the printing substance 2 wets the absorption bodies 4 very satisfactorily, with the result that the absorption bodies 4 and the printing substance 2 produce a homogeneous suspension. Through the essentially punctiform heating of the absorption bodies 4, an essentially punctiform heating of the printing substance 2 is achieved at the point at which the printing substance 2 wets the absorption body 4. In the version shown in FIG. 1, the absorption bodies have an average size of approximately 1 µm.

Figure 1C:
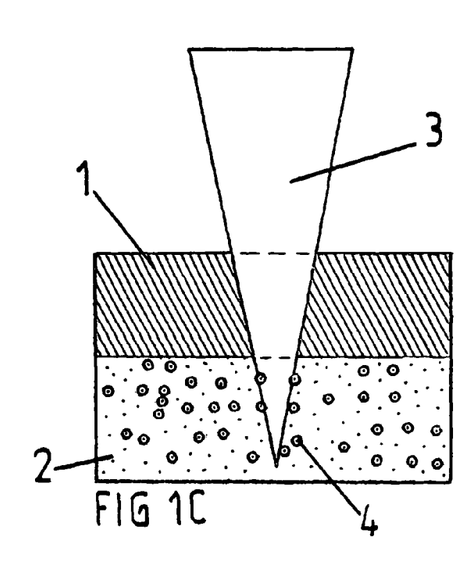

FIG. 1C shows essentially the same situation as FIG. 1B, except that here the absorption bodies are very much smaller, namely very much smaller than laser light wavelength. Through the very much smaller absorption bodies 4, the absorption effect is further enhanced as, when the light beam 3 strikes an absorption body 4, only light absorption is still brought to bear, but not light scatter.

The satisfactory wetting of the absorption bodies 4 by the printing substance can be achieved for example in that both absorption bodies 4 and also the printing substance 2 are designed polar, e.g. an alcohol can be used as solvent. Because of the electrostatic attraction, this automatically leads to satisfactory wetting. On the other hand, if the printing substance is designed less polar, if for example benzene or toluene is used as solvent, then the absorption bodies should also be as non-polar as possible, in order to guarantee satisfactory wetting.

In particular in the case of dark printing substances 2 the absorption body 4 can be developed such that it absorbs light with essentially all the light wavelengths. The result is the most complete possible absorption of the emitted laser light by the absorption bodies. However it is also possible to develop the absorption body 4 such that it absorbs only light of the corresponding laser wavelength. As an alternative to this, the absorption bodies 4 can also absorb light of whole wavelength ranges, with the result that the absorption bodies 4 are used simultaneously as dye or pigment.

Figure 2A:
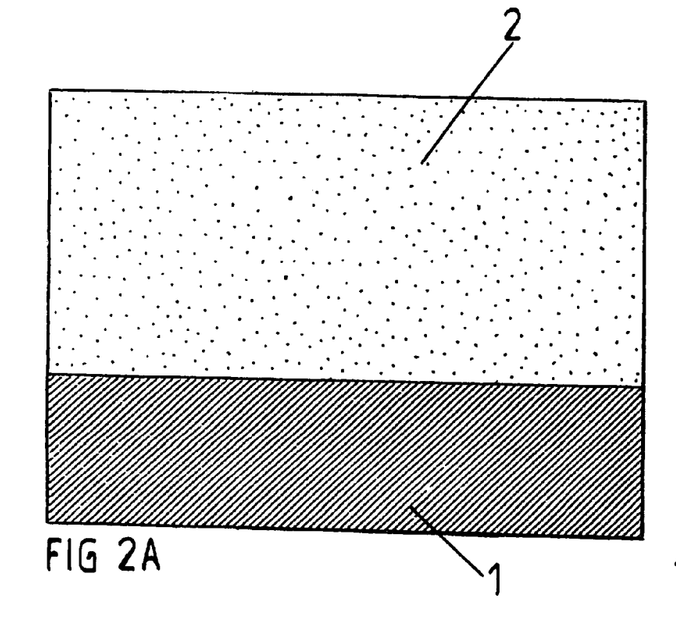
FIGS. 2A and 2B show a schematic representations of the operation of a process of the state of the art.
Figure 2B:
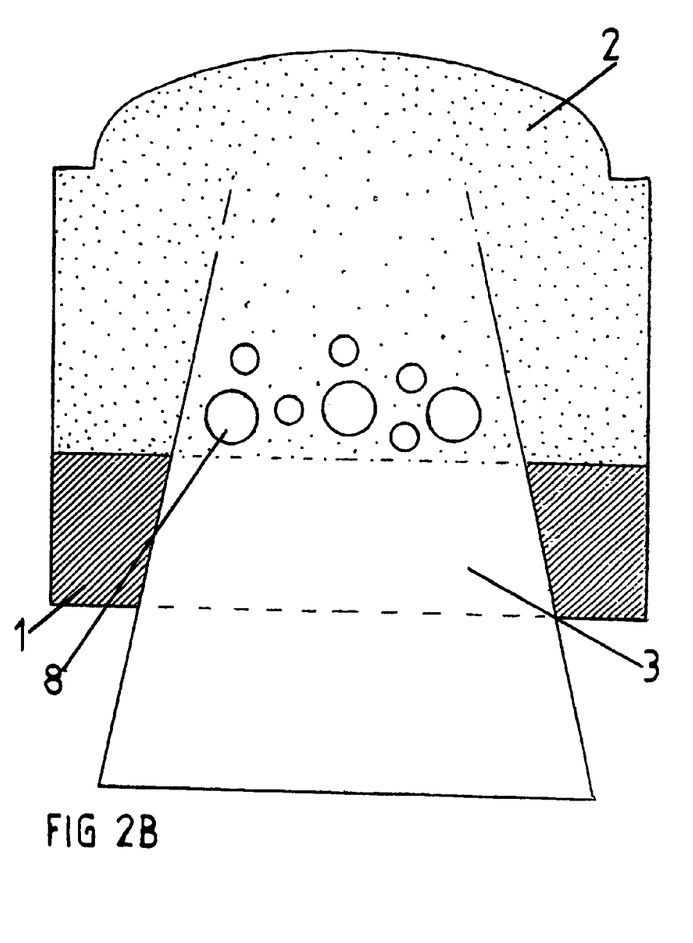

A further advantage which is achieved by the use of the absorption bodies 4, is illustrated with reference to FIGS. 2A and 2B in comparison with FIGS. 2A and 2B. FIGS. 2A and 2B once again show diagrammatically a printing process known from the state of the art. In FIG. 2A, it can be seen that the printing substance 2 is applied to the ink carrier 1. If, as shown in FIG. 2A, a laser beam is focussed into the printing substance through the ink carrier 1, vapour bubbles 8 form in the printing substance 2. As no absorption bodies 4 are present, the energy of the laser beam 3 is absorbed over a large area, with the result that the energy requirement is very high. The forming vapour bubbles 8 in addition emit a printing pulse essentially in all directions, which can lead to uncontrolled disturbances in the movement of the printing substance 2, with the result that in general no defined drop can become detached, but the printing substance is sprayed in uncontrolled manner.

Figure 3A:
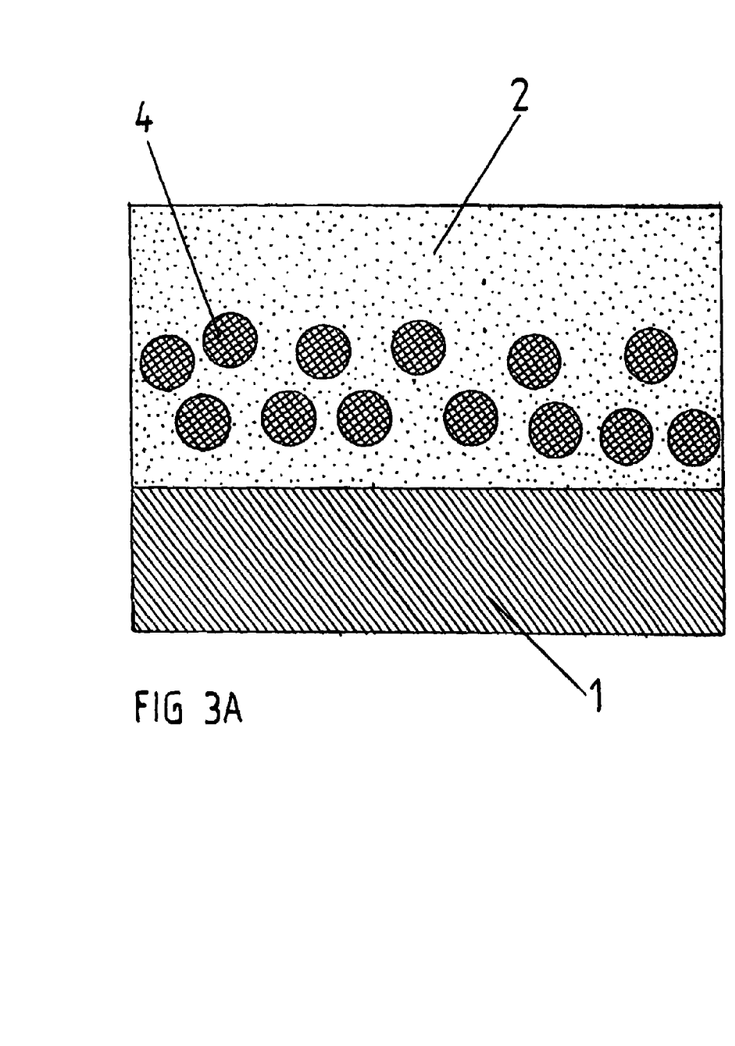
FIGS. 3A and 3B show a schematic representations of an advantageous effect of the first version of the printing process according to the invention.
Figure 3B:
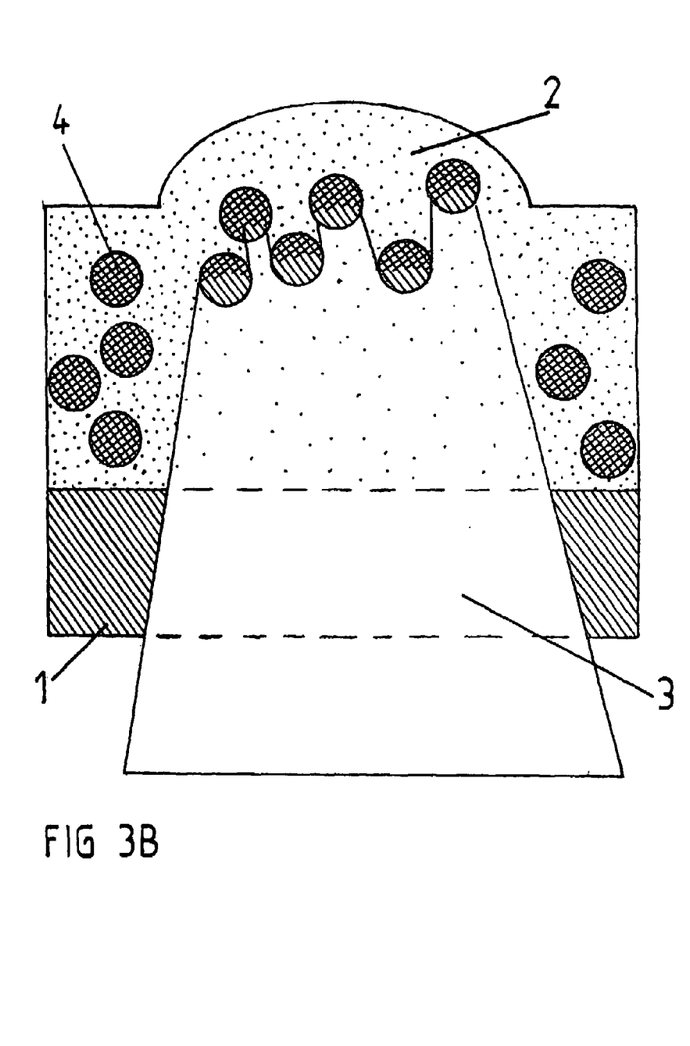

If therefore, as shown in FIG. 3A, there are absorption bodies 4 in the printing substance 2, less thermal energy is required for the ejection of a drop from the printing substance 2. This is because, firstly, the thermal energy is essentially absorbed on the surface of the absorption bodies 4, i.e. within a very small volume and, secondly, the surfaces of the absorption bodies 4 form a kind of "crystal nucleus", which ensures controlled formation of gas bubbles. As shown in FIG. 3B, during irradiation of the absorption bodies 4 by a laser beam 3 on the side of the absorption bodies 4 which the laser beam 3 strikes, a defined bubble formation occurs, which in turn accelerates the absorption body essentially in one direction, namely in the direction of the irradiated laser beam. Through this movement of the absorption bodies 4 the defined change in volume and/or position of the printing substance 2 is further supported, with the result that a defined drop detachment is favoured. The printing process as a whole is clearly shortened and can be carried out with much less energy.

Figure 4A:
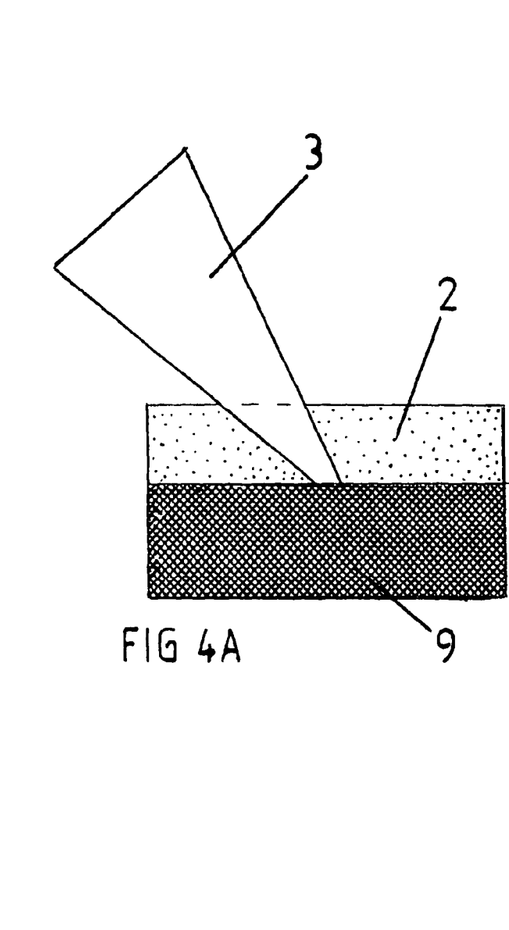
FIG. 4A through 4C show a schematic illustrations of a second version of the process according to the invention.
Figure 4B:
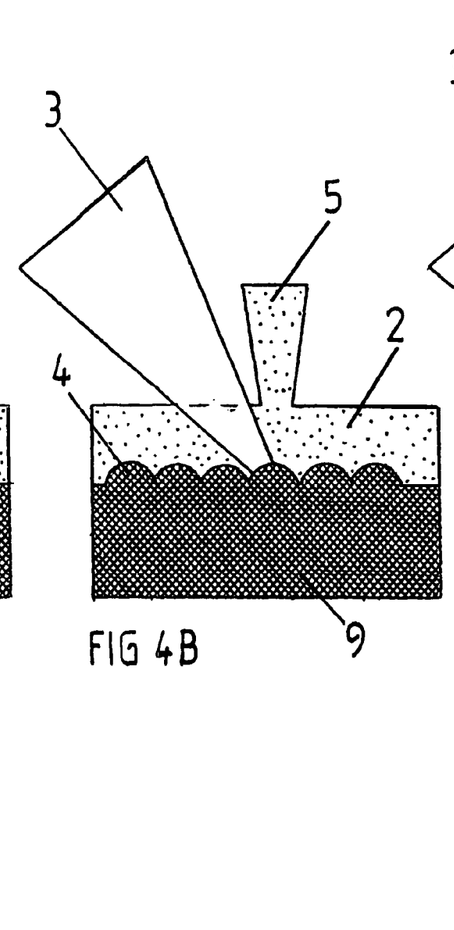
Figure 4C:
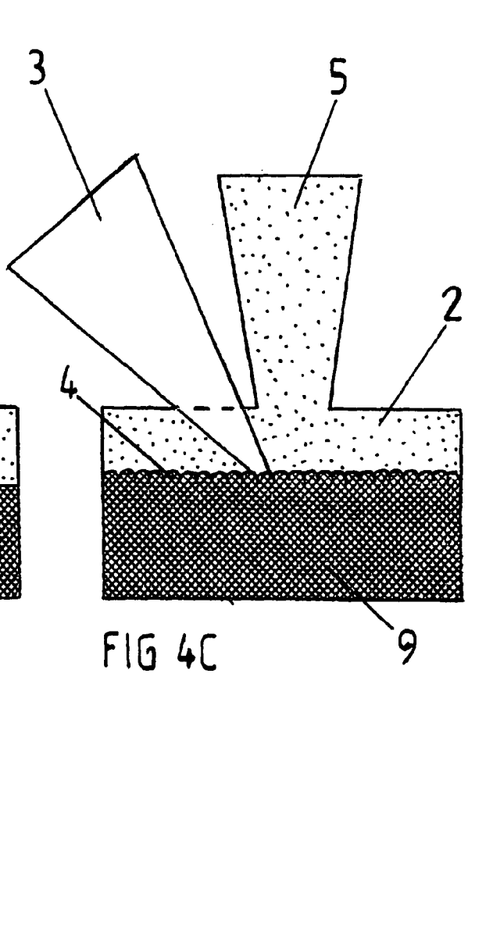

FIGS. 4A to 4C show a second version of the process according to the invention. FIG. 4a once again shows diagrammatically a printing process from the state of the art. Here a laser beam 3 is passed through the printing substance 2 onto an absorption layer 4, which is applied to an ink carrier (not shown). The absorption layer 4 is clearly heated by the laser beam 3. However this does not take place just in punctiform manner, as the heat can spread relatively rapidly in the absorption layer.

According to the invention it is therefore proposed that, as shown in FIGS. 4B and 4C, the absorption layer 4 contains absorption bodies 8. Here, too, the effect of the absorption bodies 8 is that the heat is essentially focussed in a limited manner on a local area, with the result that in a very short time the detachment of a drop from the printing substance 2 can be achieved with relatively little energy, as symbolized by the inkjet 5.

With this version also, it is advantageous to ensure that the absorption bodies provided on or in the absorption layer 9 are satisfactorily wetted by the printing substance 2. Here, also, the absorption bodies 4 are chosen to be as small as possible, i.e. so far as possible very much smaller than 1 µm in diameter, and can for example consist of carbon black particles.

In order to achieve as good as possible and largely punctiform absorption, the proportion of absorption bodies 4 in the absorption layer 9 is as high as possible. The absorption layer 9 advantageously even consists completely of pressed absorption bodies. It is also possible to embed the absorption bodies in an organic or inorganic polymer matrix or in an elastomer matrix, such as e.g. rubber.

Because the laser light is directly absorbed by the absorption body, and only a very small quantity of heat is transferred to adjacent absorption bodies or the absorption layer, in general energy of less than 5 µJ is already sufficient for a printing point with a diameter of >200 µm. For a printing point with a diameter <40 µm, 1 µJ of energy is even sufficient. In comparison with this, an electrothermal heating element, such as is used for example in the bubble-jet process mentioned at the start, requires between 20 and 30 µJ of energy for a printing point with a diameter of approximately 100 µm. The energy consumption in the case of direct laser absorption, i.e. the energy required per printing point in the case of a printing process without absorption bodies, is in general even higher.

The printing substance 2 can either be present in cells or in other regular structures, such as are known for example from DE 197 46 174, mentioned at the start, or else be designed as a homogeneous colour film. The advantage of the continuous homogeneous colour film is that the laser beam does not have to be directed into preset structures, such as occurs for example through the cells, but can be directed independently to any desired position, with the result that the printing process operates independently of resolution. However, when cells or the like are not used, the printing substance is no longer guided, with the result that the printing points lose some sharpness. In order to still be able to detach defined drops from an essentially smooth coloured surface by direct laser firing, according to the invention, besides the use of absorption bodies, which as described make possible the defined detachment of a printing point with low energy, further conditions are also observed. Thus the ink viscosity, the ink-layer thickness, the laser exposure time, the laser energy and the laser energy density in the focus as well as the correct blowing agent ratio have to be set in the printing substance. If the exposure time can be kept very short, i.e. very much less than 1 µs, and the process energy in the laser focus lies clearly above the threshold value (very much greater than 500 kW/cm$^2$) at a laser wavelength of approximately 1 µm, the ejection of a drop occurs due to the very high rate of heating up in such a short time that a shock wave spreads perpendicular to the surface in the direction of the imprinting material and the adjacent printing substance is a kind of guide because of its mass moment of inertia.

Figure 5A:
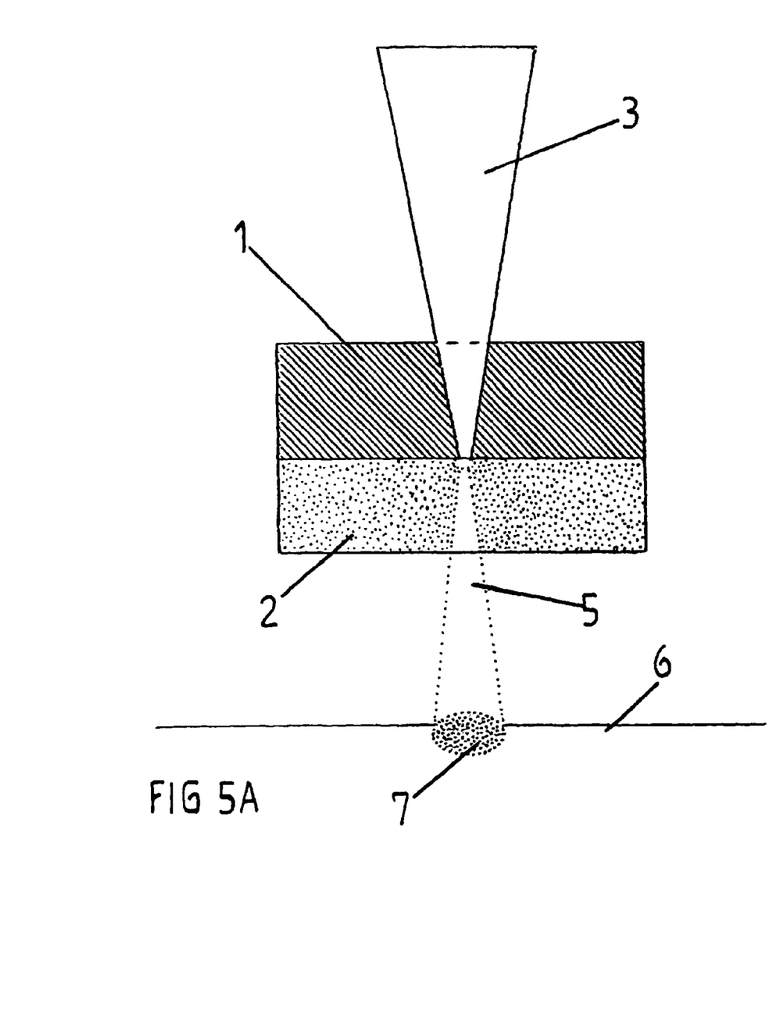
FIGS. 5A and 5B show a schematic representations of the influence of the correct energy parameters.
Figure 5B:
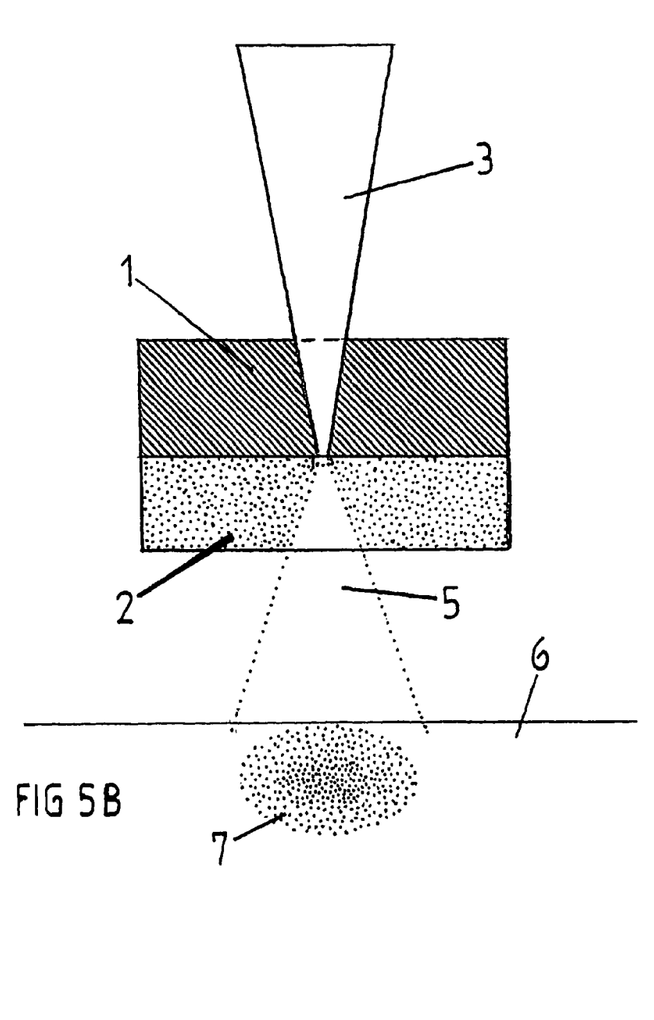

This has been once again illustrated in FIGS. 5A and 5B. FIG. 5A shows the situation in which the preset printing parameters are observed. The laser beam 3 is focussed into the printing substance 2, with the result that a drop 5 detaches from the printing substance 2 and generates a defined sharp printing point 7 on the imprinting material 6. In contrast to this, FIG. 5B shows the situation in which the preset parameters are not observed. As the energy used here is clearly higher and the whole area surrounding the focus is also heated up, the result here is an uncontrolled ejection of a drop 5, with the result that a much larger printing point 7 forms on the imprinting material 6.

Figure 6A:
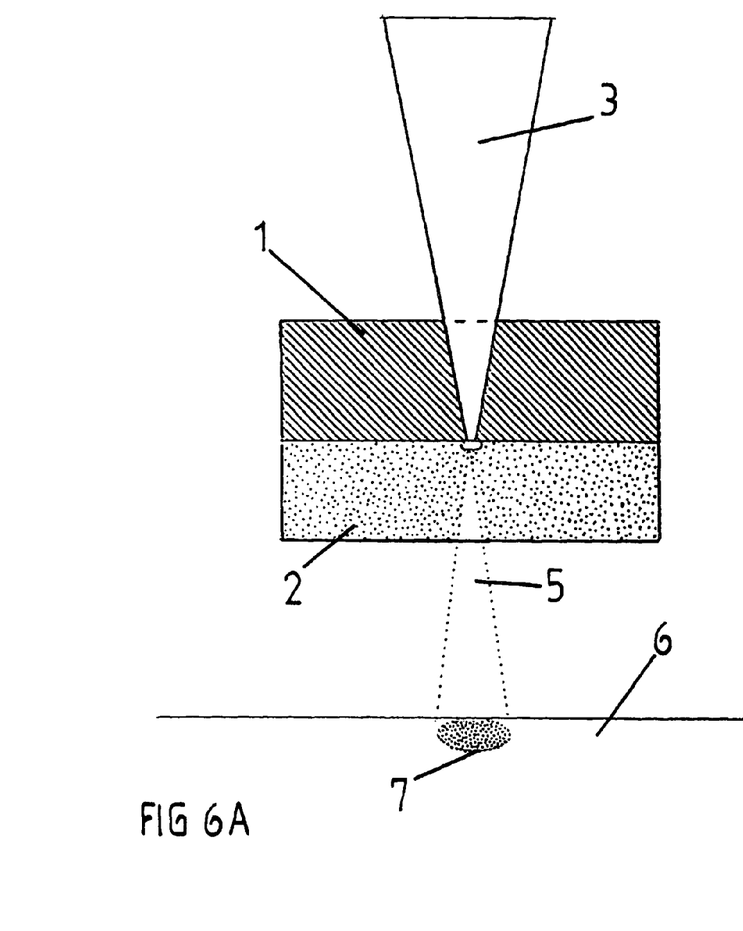
FIGS. 6A and 6B show a schematic representations of the influencing of the printing-point size.
Figure 6B:
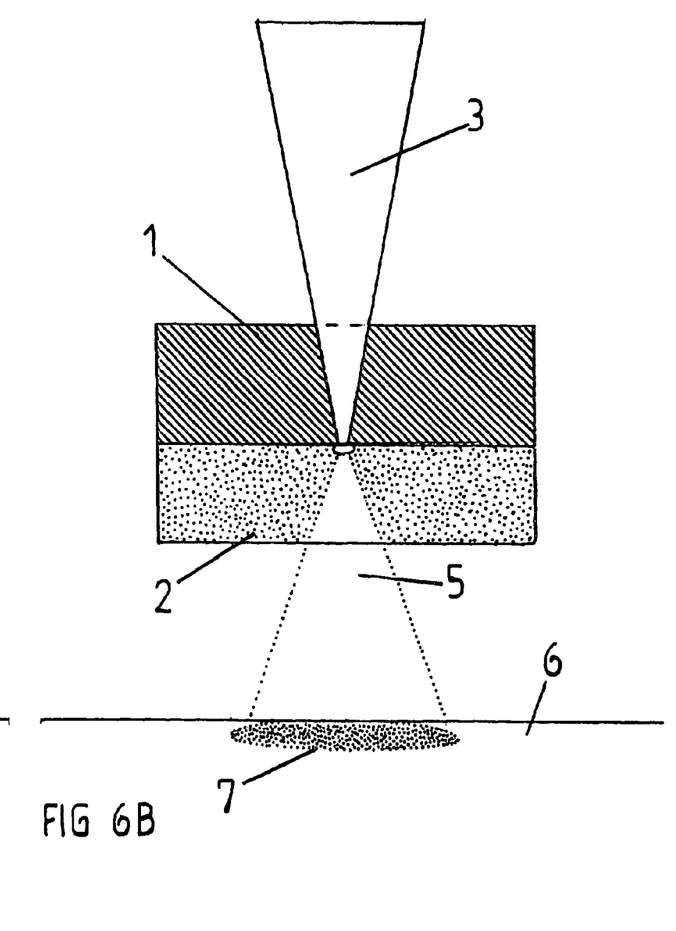

FIGS. 6A and 6B show how, according to the invention, the printing-point size can be changed by variation of individual printing parameters. Tests have shown that the size of the printing point and the colour density of the printing point increase with increasing exposure time, i.e. with the pulse duration of the laser. The size of the printing point can thus be varied in almost infinitely small steps. Differences in brightness in the image to be printed can therefore be represented by printing points of different size. Overall it is possible, through the printing process according to the invention, to clearly improve the print format. The resolution can be increased almost at will, as the printing process is not connected with any kind of preset raster.

Figure 7:
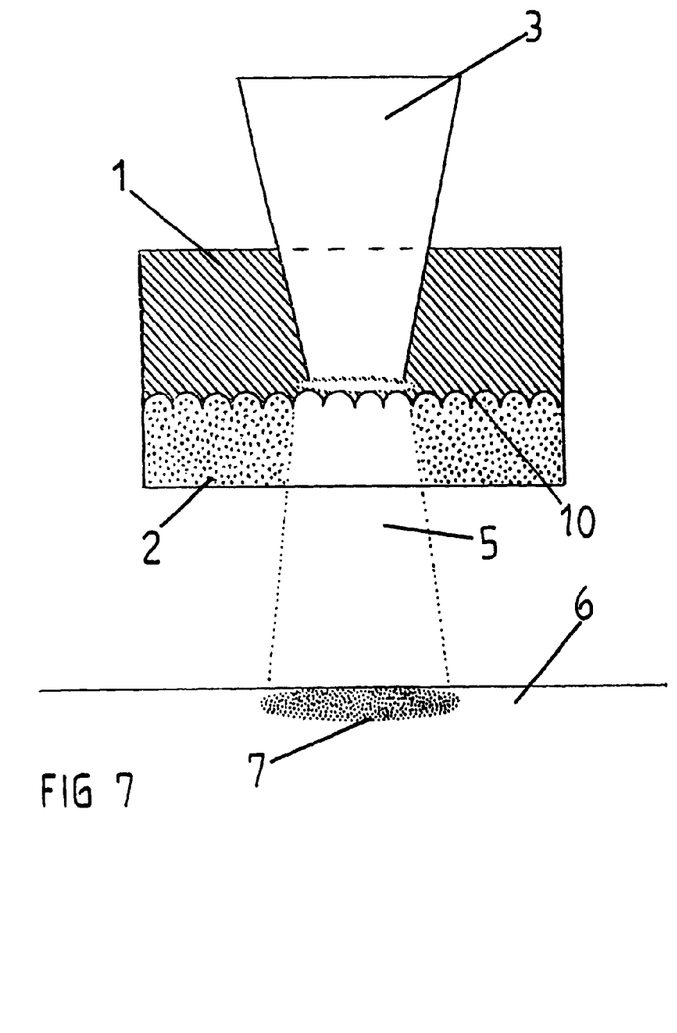
FIG. 7 shows a schematic representation of the influence of the microstructure on the printing point.

FIG. 7 shows a further preferred version of the invention. It is clear that the ink carrier 1 has a surface with recesses and/or elevations. The recesses are here applied in the form of grooves 10. The recesses and/or elevations 10 preferably have a diameter of less than 25 µm. The respective depth and height of the recesses and/or elevations is also preferably less than 25 µm. The structure is thus extremely fine. The printing substance forms a continuous surface on the structure of the ink carrier, as also shown in FIG. 6. The laser beam 3 passes from behind through the transparent ink carrier 1. The microstructure applied to the ink carrier 1, which can also have the form of cells and/or grooves, ensures that the shock wave conveyed through the absorption bodies runs as far as possible perpendicular to the surface of the ink carrier 1. Surprisingly in several tests it was established that, by suitable "roughening" of the surface of the ink carrier, the quality of the generated printing point 7 on the imprinting material 6 can be considerably enhanced.

At the same time almost any desired fine resolution can be achieved. This is an essential feature distinguishing this version from those printing processes in the state of the art which use cells on the ink carrier. The known cells are distinctly larger, with the result that the printing substance is situated exclusively in the cells (any supernatant printing substance is scraped off). In contrast to this the microstructure here is chosen so that the printing substance forms a continuous layer beyond the structure. The structure is thus completely covered by the printing substance.

The microstructure is irregularly structured in a particularly preferred version, i.e. the individual recesses and/or elevations vary in their extent and depth. A variation of approximately 10–50% of the dimension of the recess and/or elevation is advantageously chosen. The elevations and/or recesses are expediently formed such that the shock wave produced upon striking of the electromagnetic wave is advantageously shaped, with the result that the cleanest possible printing point forms.

Figure 8:
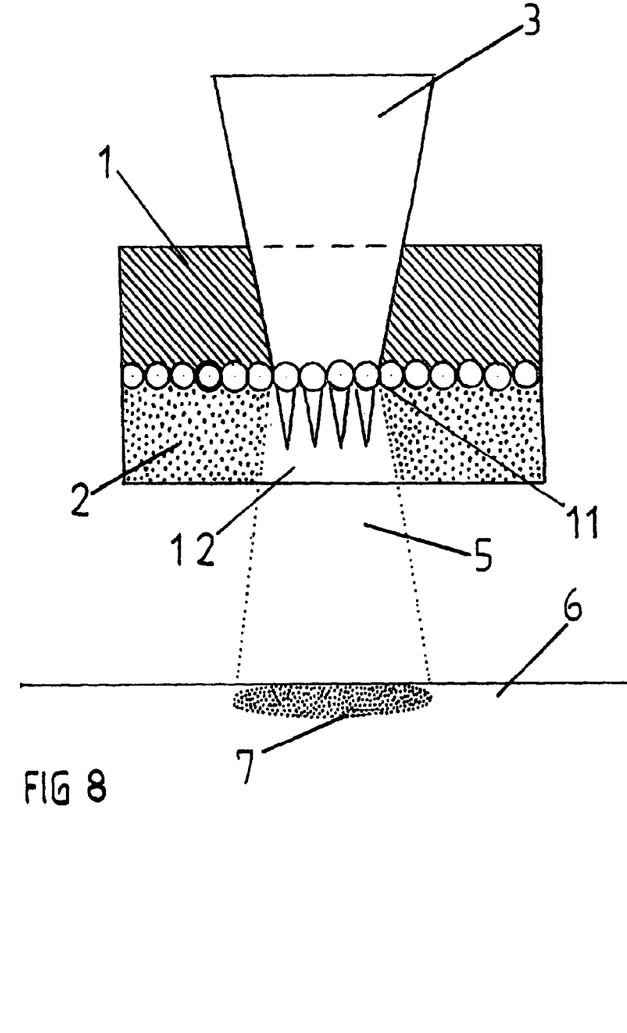
FIG. 8 shows a schematic representation of the influence of light-focussing elements.

FIG. 8 shows a further version of the present invention. Here light-focussing elements 11 are applied to the ink carrier 1. These light-focussing elements form a microlens system which ensures that the incident focussed light beam is once again split into several small focal spots, so-called "hot spots". The result of this is that the energy density is further increased at certain points, with the result that the energy to be introduced overall can be still further reduced. The individual light-focussing elements 11 are smaller than the focus of the laser, i.e. smaller than 30 μm, preferably smaller than 15 μm, and particularly preferably smaller than 10 μm. The light-focussing elements can, in the arrangement shown in FIG. 7 with a transparent ink carrier 1, in principle be arranged both on the side of the ink carrier 1 facing away from the printing substance 2, and also on the side of the ink carrier 1 wetted with printing substance 2. Of course the light-focussing elements can also be integrated into the ink carrier 1.

Figure 9A:
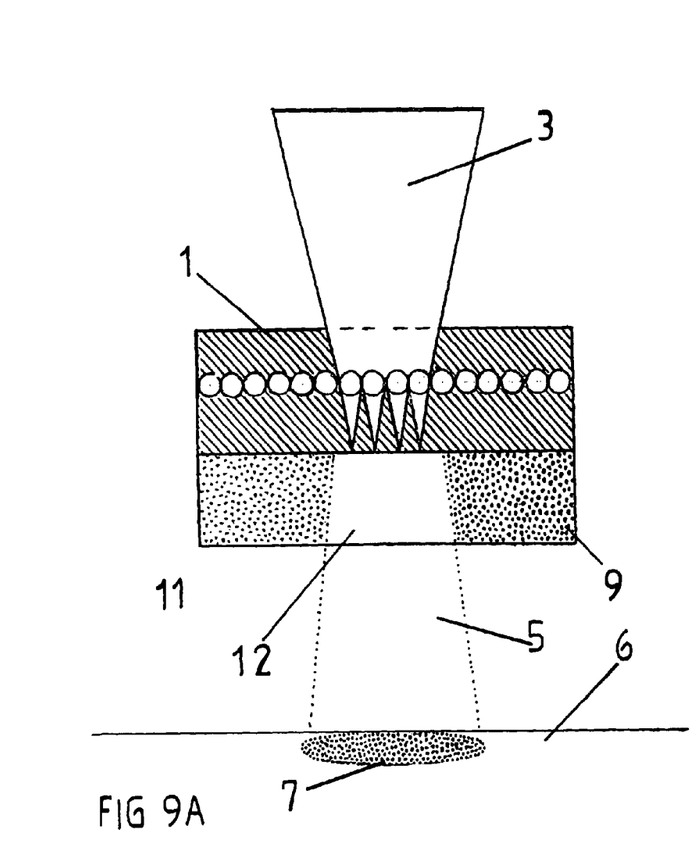
FIGS. 9A and 9B show exemplary arrangements of the light-focusing elements.
Figure 9B:
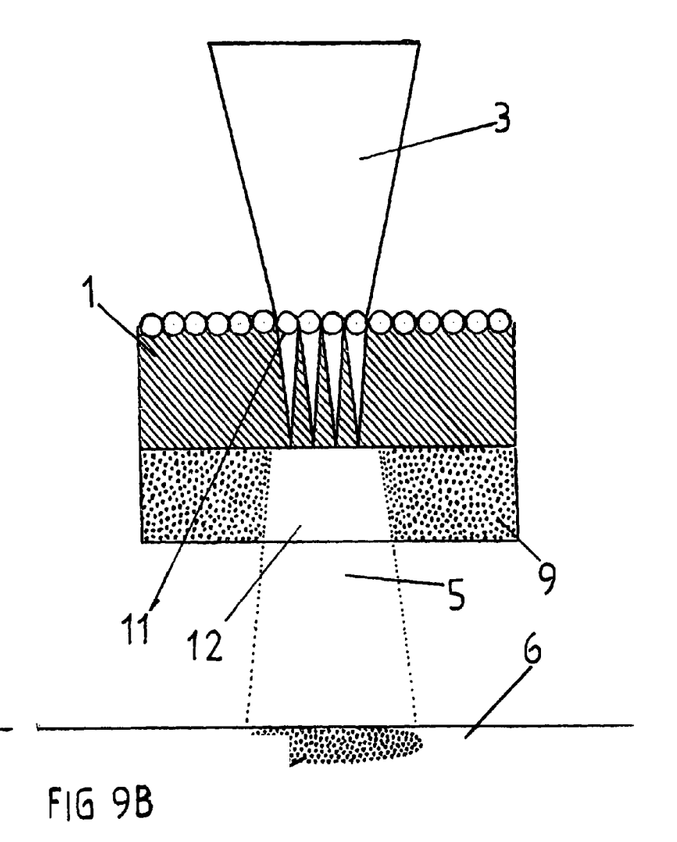

FIGS. 9A and 9B show versions with different arrangements of the light-focussing elements 11.

Figure 10:
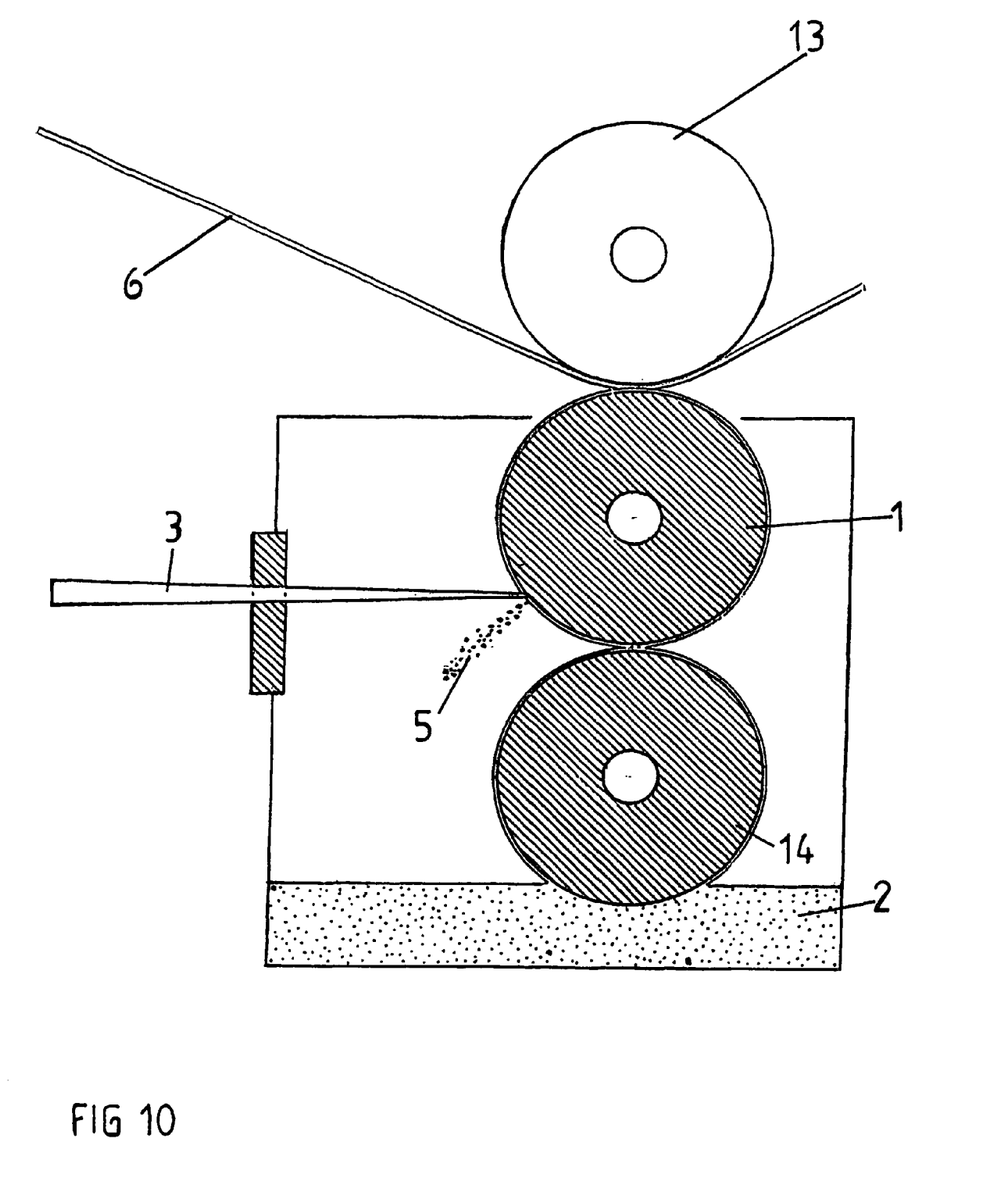
FIG. 10 shows another version in a "negative" arrangement and FIG. 11 shows another version with an additional, interposed ink carrier.

Finally, FIG. 10 shows a "negative" arrangement of the printing process according to the invention. The laser beam 3, which is focussed on the ink carrier 1, can be seen. The cylindrical ink carrier 1 is in contact on one side with a dipping roller 14 which in turn dips into a bath with printing substance 2. Upon rotation of the dipping roller and the ink carrier 1 it is ensured that the surface of the ink carrier 1 is covered with printing substance 2.

At certain points individual areas of the printing-substance layer are removed from the ink carrier by means of the laser beam 3. As the ink carrier 1 additionally comes into contact with the imprinting material running over a printing roller 13, that part of the printing substance which has not been removed by the laser is transferred onto the imprinting material 6. Unlike the process described at the start, here the laser is focussed on the areas which are not to contribute to the transfer of the printing substance.

It is understood that the additional features of the versions described can also be advantageously realized in other printing processes or in other printing machines.

Figure 11:
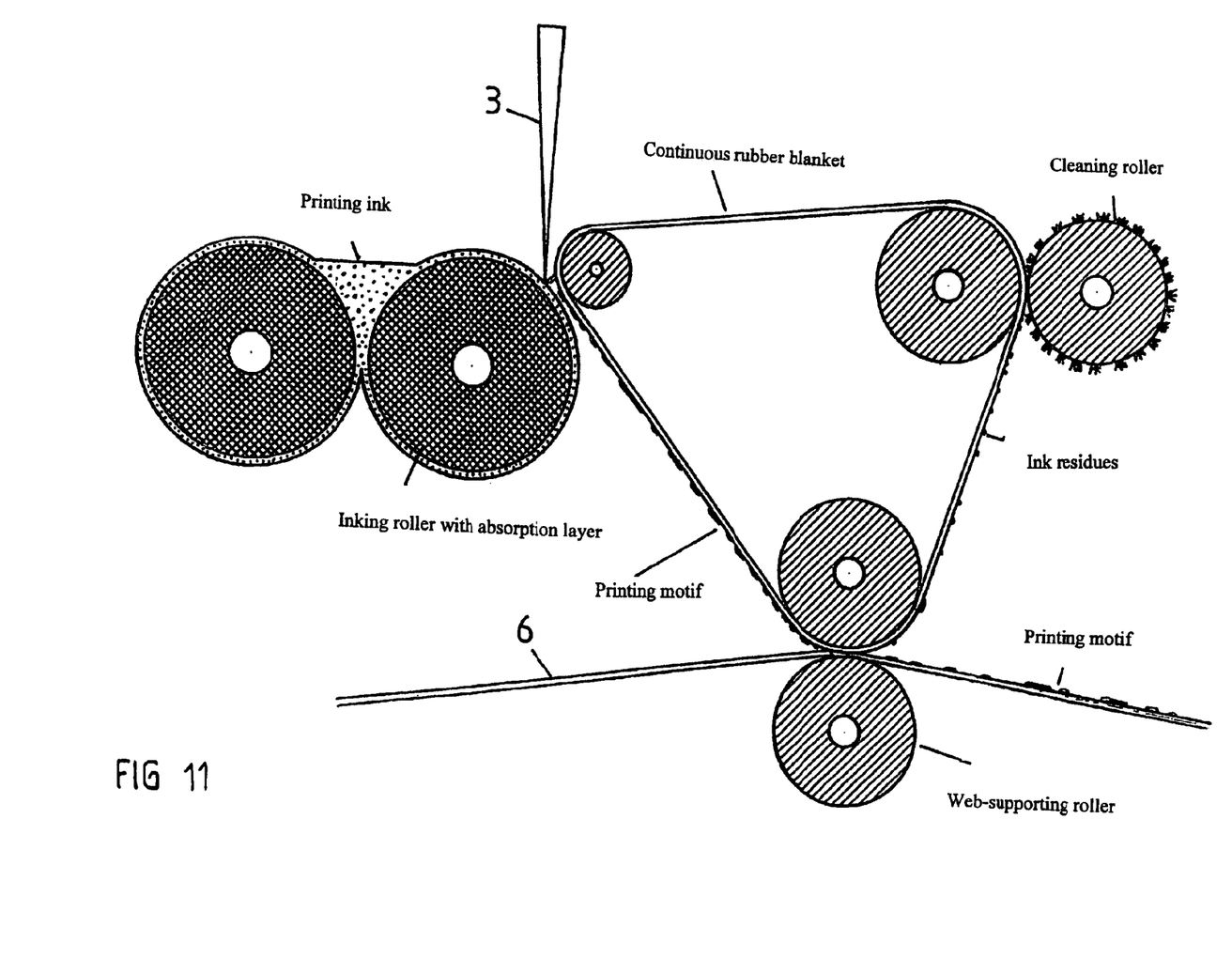

Finally, FIG. 11 shows a further version of the present invention in which, between an inking roller with an absorption layer, onto which the laser is directed, and the printing material guided over a supporting roller, or the web to be imprinted, a continuous blanket guided over several rollers is provided as print transfer medium. This can in particular be a rubber blanket, rubber blankets having the favourable property that they can be guided over particularly narrow radii of curvature.

The supporting or carrying roller for the rubber blanket, arranged opposite the inking roller, can then have a relatively small diameter, such that it is possible to allow the laser to strike the absorption layer of the inking roller at a relatively steep angle and yet in very close proximity to the rubber blanket, with the result that the drops of ink thereby detached have only a very short distance to travel before they reach the rubber blanket. The rubber blanket is then guided over a printing roller, which lies opposite a supporting roller for the printing web, with the result that the ink can be transferred from the rubber blanket onto the printing web.

Any ink residues still adhering to the rubber blanket after the printing procedure are then removed by a cleaning roller.

The invention claimed is:

1. A printing process for the transfer of liquid printing substance (2) from an ink carrier (1) to an imprinting material (6), in which, with the help of an energy-emitting apparatus, which, during a process period, emits energy in the form of electromagnetic waves (3), such that with the help of absorption bodies (4), energy is transferred from the electromagnetic waves (3) into the printing substance (2) causing a change in volume and/or position, so that printing substance is first transferred to a print transfer medium and then from the print transfer medium to the imprinting material, said electromagnetic waves being directed so that they avoid passage through the transfer medium.

2. A printing process according to claim 1, characterized in that wherein absorption bodies (4) are used which that are smaller than the wavelength of the electromagnetic waves (3).

3. A printing process according to claim 1, wherein absorption bodies (4) are used that are smaller than 1/10 of the wavelength of the electromagnetic waves (3).

4. A printing process according to claim 1, wherein absorption bodies (4) are used that are smaller than 1/50 of the wavelength of the electromagnetic waves (3).

5. A printing process according to claim 1 wherein the apparatus emits energy in the form of laser light (3).

6. A printing process according to claim 5 wherein printing-point size is controlled by a profile of the laser light.

7. A printing process according to claim 1 wherein a printing substance (2) is used which contains absorption bodies (4).

8. A printing process according to claim 7, characterized in that the absorption bodies (4) are also used as dye.

9. A printing process according to claim 1 wherein the absorption bodies (4) absorb essentially all the light wavelengths.

10. A printing process according to claim 1 wherein the absorption bodies (4) absorb essentially only the radiation with a wavelength or in a wavelength range which corresponds to the wavelength or wavelength range of the electromagnetic waves 3 emitted by the energy-emitting apparatus.

11. A printing process according to claim 10 wherein the absorption bodies (4) are accelerated in the direction of the imprinting material (6) by the electromagnetic waves (3) of the energy-emitting apparatus.

12. A printing process according to claim 1 wherein an ink carrier (1) is used having a surface provided to receive the printing substance (2), which surface has absorption bodies (4) which form a solid layer.

13. A printing process according to claim 1 wherein printing-point size is controlled by the quantity of energy released by the energy-emitting apparatus.

14. A printing process according to claim 13 wherein the quantity of energy released by the energy-emitting apparatus is controlled by a process period.

15. A printing process according to claim 1 wherein differences in brightness of the image to be printed are achieved by variation of the printing-point size.

16. A printing process according to claim 1 wherein the process period is shorter than 1 μs.

17. A printing process according to claim 1 wherein the process period is shorter than 250 ns.

18. A printing process according to claim 1 wherein the process period is shorter than 100 ns.

19. A printing process according to claim 1 wherein the process period is shorter than 50 μs.

20. A printing process according to claim 1 wherein during the process period an energy density higher than 500 kW/cm$^2$ is generated at the absorption body (4).

21. A printing process according to claim 1 wherein during the process period an energy density higher than 2 MW/cm$^2$ is generated at the absorption body (4).

22. A printing process according to claim 1 wherein during the process period an energy density higher than 10 MW/cm$^2$ is generated at the absorption body (4).

23. A printing process according to claim 1 wherein the absorption bodies (4) are heated during the process period with an average heating rate greater than 10$^9$ K/s.

24. A printing process according to claim 1 wherein the absorption bodies (4) are heated during the process period with an average heating rate greater than 10$^{11}$ K/s.

25. A printing process according to claim 1 wherein the thickness of the printing substance (2) on the ink carrier is less than 50 μm.

26. A printing process according to claim 1 wherein the printing substance (2) is selected so that the viscosity lies between 0.05 and 0.5 Pas.

27. A printing process according to claim 1 wherein for the production of a printing point with a diameter greater than 100 μm, an energy of not more than 10 μJ, is transferred.

28. A printing process according to claim 1 wherein through the change in volume and/or position of the printing substance some of the printing substance is removed from the ink carrier and is at least partly transferred to the imprinting material.

29. The printing process according to claim 1 where the print transfer medium can be roller guided about a radius.

30. The printing process according to claim 1 where the print transfer medium is a continuous blanket.

31. The printing process according to claim 1 wherein printing is line-by-line, areas to be printed within a line being formed by line segments of any choosable length and any choosable position.

32. The printing process according to claim 31 wherein the line-by-line printing takes place with a continuous wave laser, which travels line-by-line down the lines of print following a preset raster and which can be switched on and off or revealed or masked as desired along a line.

33. A printing machine for the transfer of liquid printing substance (2) to an imprinting material, said machine having an ink carrier (1) for holding ink and an energy-emitting apparatus, for emitting energy in the form of electromagnetic waves during a process period, which energy-emitting apparatus is arranged such that energy can be transferred in a targeted manner onto certain areas of the ink carrier (1), wherein absorption bodies (4) on the ink carrier are provided for absorbing the energy such that with the help of the absorption bodies (4), energy is transferred from the electromagnetic waves (3) into the printing substance (2) causing a change in volume and/or position of printing substance causing printing substance transfer, said machine being arranged so that printing substance is first transferred to a print transfer medium and then from the print transfer medium to the imprinting material, said energy-emitting apparatus being arranged such that said electromagnetic waves are directed so that they avoid passage through the transfer medium.

34. A printing machine according to claim 33, wherein the energy-emitting apparatus is a laser.

35. A printing machine according to 33, wherein the absorption bodies (4) are of a size which is smaller than 1 μm.

36. A printing machine according to 33, wherein the absorption bodies (4) are of a size which is smaller than 200 nm.

37. A printing machine according to claim 33, wherein the absorption bodies (4) are of a size which is between 10 and 50 nm.

38. A printing machine according to claim 33, wherein the absorption bodies consist of carbon black particles, titanium nitride or mixtures thereof.

39. A printing machine according to claim 33, wherein the absorption bodies (4) are arranged in an absorption layer (9) arranged on the ink carrier (1).

40. A printing machine according to claim 39, wherein the absorption layer (9) consists of pressed absorption bodies (4).

41. A printing machine according to claim 39, wherein the absorption bodies (4) are embedded in an organic or inorganic polymer matrix.

42. A printing machine according to claim 39, wherein at the ink carrier (1) has a surface structure which consists of recesses and/or elevations.

43. A printing machine according to claim 33, wherein the proportion of the absorption bodies (4) in the absorption layer (5) is greater than 40 wt percent.

44. A printing machine according to claim 33, wherein light-focussing elements are applied to the ink carrier.

45. A printing machine according to claim 44, wherein the light focusing elements are formed by a flexible polymer film.

46. A printing machine according to claim 33, wherein the ink carrier is transparent and the light-focussing elements are integrated into the ink carrier.

47. The printing machine according to claim 33 where the print transfer medium can be roller guided about a radius.

48. The printing machine according to claim 33 where the print transfer medium comprises rubber.

49. The printing machine according to claim 33 where the print transfer medium is a cylinder comprising rubber.

* * * * *